US008989063B2

(12) United States Patent
Liang et al.

(10) Patent No.: US 8,989,063 B2
(45) Date of Patent: Mar. 24, 2015

(54) TIME DIVISION MULTIPLE ACCESS FAR END CROSSTALK CHANNEL ESTIMATION

(71) Applicant: Futurewei Technologies, Inc., Plano, TX (US)

(72) Inventors: Haixiang Liang, Atherton, CA (US); Yuchen Jia, Santa Clara, CA (US); Chin Ngek Hung, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 234 days.

(21) Appl. No.: 13/674,442

(22) Filed: Nov. 12, 2012

(65) Prior Publication Data
US 2014/0029406 A1 Jan. 30, 2014

Related U.S. Application Data

(60) Provisional application No. 61/675,582, filed on Jul. 25, 2012.

(51) Int. Cl.
*H04B 3/20* (2006.01)
*H04L 5/14* (2006.01)
(Continued)

(52) U.S. Cl.
CPC ... *H04J 3/10* (2013.01); *H04B 3/32* (2013.01); *H04M 11/062* (2013.01)
USPC .............................. 370/292; 370/201; 370/294

(58) Field of Classification Search
CPC .......... H04B 3/23; H04B 3/238; H04M 3/002
USPC .................................. 370/286, 292, 201, 294
See application file for complete search history.

(56) References Cited

U.S. PATENT DOCUMENTS

2009/0073867 A1* 3/2009 Schenk .......................... 370/201
2009/0175156 A1    7/2009 Xu
(Continued)

FOREIGN PATENT DOCUMENTS

CN    101908909 A    12/2010
CN    102388588 A    3/2012

OTHER PUBLICATIONS

"Series G: Transmission Systems and Media, Digital Systems and Networks, Digital Sections and Digital Line System-Access Networks, Very High Speed Digital Subscriber Line Transceivers (VDSL2)," ITU-T G. 993.2, Dec. 2011, 382 pages.
(Continued)

*Primary Examiner* — Ronald Abelson
(74) *Attorney, Agent, or Firm* — Conley Rose, P.C.; Grant Rodolph; William H. Dietrich

(57) ABSTRACT

A method of far-end crosstalk (FEXT) channel estimation in a digital subscriber line (DSL) system, wherein the DSL system comprises a first subscriber line and a second subscriber line, the method comprising allocating a plurality of time slots, wherein the plurality of time slots comprises a first period and a second period, wherein the first period precedes the second period, and wherein each of the first and second periods comprises at least one time slot, transmitting at least one training symbol in the first period onto the second subscriber line in a downstream direction while no transmission is made on the first subscriber line, receiving at least one feedback symbol in the second period from the first subscriber line in an upstream direction, and estimating a level of downstream FEXT from the second subscriber line into the first subscriber line based on the at least one feedback symbol.

24 Claims, 9 Drawing Sheets

(51) Int. Cl.
*H04J 1/12* (2006.01)
*H04B 3/32* (2006.01)
*H04J 3/10* (2006.01)
*H04M 11/06* (2006.01)

(56) References Cited

U.S. PATENT DOCUMENTS

2010/0195817 A1* 8/2010 Cendrillon et al. ...... 379/406.06
2012/0075984 A1 3/2012 Cendrillon et al.

OTHER PUBLICATIONS

"Series G: Transmission Systems and Media, Digital Systems and Networks, Digital Sections and Digital Line System-Access Networks, Self-FEXT Cancellation (Vectoring) for Use with DVSL2 Transceivers," ITU-T G.993.5, Apr. 2010, 80 pages.

"Series G: Transmission Systems and Media, Digital Systems and Networks, Digital Sections and Digital Line System-Access Networks, Handshake Procedures for Digital Subscriber Line (DSL) Transceivers," ITU-T 994.1, Feb. 2007, 848 pages.

Foreign Communication From a Counterpart Application, PCT Application No. PCT/CN2013/080091, International Search Report dated Oct. 31, 2013, 6 pages.

Foreign Communication From a Counterpart Application, PCT Application No. PCT/CN2013/080091, Written Opinion dated Oct. 31, 2013, 3 pages.

* cited by examiner

TIME DIVISION MULTIPLE ACCESS FAR END CROSSTALK CHANNEL ESTIMATION

CROSS-REFERENCE TO RELATED APPLICATIONS

The present application claims priority to U.S. Provisional Patent Application No. 61/675,582 filed Jul. 25, 2012 by Haixiang Liang et al. and entitled "Time Division Multiple Access Far End Crosstalk Channel Estimation", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Digital subscriber line (DSL) technologies can provide a large bandwidth for digital communications over existing subscriber lines. When transmitting data over the subscriber lines, crosstalk interference can occur between the transmitted signals over adjacent twisted-pair phone lines, for example in a same or nearby bundle of lines. Crosstalk, including near-end crosstalk (NEXT) and far-end crosstalk (FEXT), may limit the performance of various DSL systems such as those defined by standards including asymmetric DSL 2 (ADSL2), very high speed DSL 2 (VDSL2), and G.fast (future standard). In use, crosstalk can be reduced or canceled by joint processing of signals in multiple subscriber lines. Depending on whether the signals are in a downstream or upstream direction, a crosstalk precoder or canceller may be used on an operator's end of a DSL system, such as a digital subscriber line access multiplexer (DSLAM). For example, crosstalk precoding is a technique in which downstream signals are pre-distorted prior to transmission through a binder. A pre-distortion filter or 'precoding matrix' is used to pre-distort the signals, and thus cancel FEXT that occurs between subscriber lines in the binder. The signals may then arrive at receivers located at different customer sites with less or no FEXT, thereby achieving higher data-rates.

Broadband access communication technologies, such as very-high-speed digital subscriber line (VDSL), VDSL2, and future standard G.fast to be issued by International Telecommunication Union Telecommunication Standardization Sector (ITU-T) Study Group 15 (SG15), may provide data for triple-play services. For example, television, internet, voice over internet protocol (VoIP) phone services may all be supported. Channel capacity in the physical media dependent (PMD) layer of a DSL system may be high (e.g., near gigabits in G.fast) in the case of a single subscriber line. However, when multiple subscriber lines are deployed in a same binder, actual data rate may be lower than the channel capacity due to NEXT and/or FEXT.

In a DSL system, NEXT may be reduced or canceled via the use of synchronous time division duplexing (STDD). In the STDD mode, all subscriber lines connected to, for example, a transceiver (transmitter and receiver) located in a customer premise equipment (CPE) may be configured to either transmit upstream signals or receive downstream signals at any given time, but not simultaneously. A transceiver located in a DSLAM may be configured similarly. Therefore, for the transceiver either in a DSLAM or CPE, it may either be in a transmitting mode or receiving mode. Downstream and upstream time division may allow a transceiver to avoid its own transmitter echo, and STDD may help prevent NEXT between subscriber lines.

In use, FEXT mitigation may require estimation of downstream and upstream FEXT channels. For instance, in the ITU-T G.993.5 Recommendation, a FEXT training signal may be sent during a sync symbol (SS). A plurality of sync symbols corresponding to a plurality of subscriber lines may be modulated by an orthogonal sequence. The length of the orthogonal sequence may be proportional to a number of subscriber lines. As the number of subscriber lines increases, a training time may increase, and a total level of FEXT in the subscriber lines may also increase. Sometimes, the FEXT level may become stronger than a received data signal. In this case, the training of a frequency domain equalizer (FEQ) and a FEXT precoder/canceller may not work well, which results in loss of system performance. Further, FEXT may be relatively stronger in high frequency subcarriers. Thus, the training problem or issue may be worse in DSL systems, e.g., G.fast, which may increase the high frequency band edge from, for example, 17/30 megahertz (MHz) used in VDSL2 to 100 MHz or higher. Thus, there may be a need for improved FEXT compensation in DSL systems.

SUMMARY

In one embodiment, the disclosure includes a DSLAM configured to couple to a first subscriber line and a second subscriber line, the DSLAM comprising a processor configured to allocate a plurality of time slots for downstream FEXT channel estimation, wherein the plurality of time slots comprises a first period and a second period, wherein the first period precedes the second period, and wherein each of the first and second periods comprises at least one time slot, a transmitter coupled to the processor and configured to transmit at least one training symbol in the first period onto the second subscriber line while no transmission is made on the first subscriber line, and a receiver coupled to the processor and configured to receive at least one feedback symbol in the second period from the first subscriber line, and wherein the processor is further configured to estimate a level of downstream FEXT from the second subscriber line into the first subscriber line based on the at least one feedback symbol.

In another embodiment, the disclosure includes a method of FEXT channel estimation in a DSL system, wherein the DSL system comprises a first subscriber line and a second subscriber line, and wherein the first and second subscriber lines are subject to FEXT, the method comprising allocating a plurality of time slots, wherein the plurality of time slots comprises a first period and a second period, wherein the first period precedes the second period, and wherein each of the first and second periods comprises at least one time slot, transmitting at least one training symbol in the first period onto the second subscriber line in a downstream direction while no transmission is made on the first subscriber line, receiving at least one feedback symbol in the second period from the first subscriber line in an upstream direction, and estimating a level of downstream FEXT from the second subscriber line into the first subscriber line based on the at least one feedback symbol.

In yet another embodiment, the disclosure includes an apparatus used in DSL communication comprising a receiver configured to receive a downstream signal in a first period from a first subscriber line, wherein the downstream signal comprises a component induced by FEXT from a second subscriber line introduced into the first subscriber line, a processor configured to generate an error signal based on the downstream signal, wherein the error signal is a measure of FEXT from the second subscriber line introduced into the first subscriber line, and a transmitter configured to transmit at least one feedback symbol comprising the error signal in a second period onto the first subscriber line, wherein the first period precedes the second period, and wherein each of the first and second periods comprises at least one time slot.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are systems and methods for improved estimation of FEXT channels. In the present disclosure, a DSLAM may be coupled to a plurality of subscriber lines, which may, e.g., include a first subscriber line, a second subscriber line, and a third subscriber line. A processor located in the DSLAM may be configured to allocate a first and a second plurality of time slots to estimate upstream or downstream FEXT channels. In an embodiment of downstream FEXT estimation, the first plurality of time slots may sequentially comprise a first period and a second period, each of which comprises at least one time slot. The DSLAM may transmit or send at least one training symbols onto the second subscriber line in the first period while no transmission is made on the first and third subscriber lines. Then, the DSLAM may receive a feedback symbol from the first subscriber line in the second period. A level of downstream FEXT from the second subscriber line into the first subscriber line may be estimated based on the feedback symbol. Other tasks such as precoder/canceller training may also be performed in the first plurality of time slots. Similarly, in the second plurality of time slots, a level of downstream FEXT from the third subscriber line into the first subscriber line may be estimated based on another feedback symbol. Since FEXT estimation is made per disturber line at a time, this approach may be referred to as a time division multiple access (TDMA) approach. The present disclosure may improve speed and/or performance of FEXT estimation and training in both upstream and downstream directions.

Figure 1:
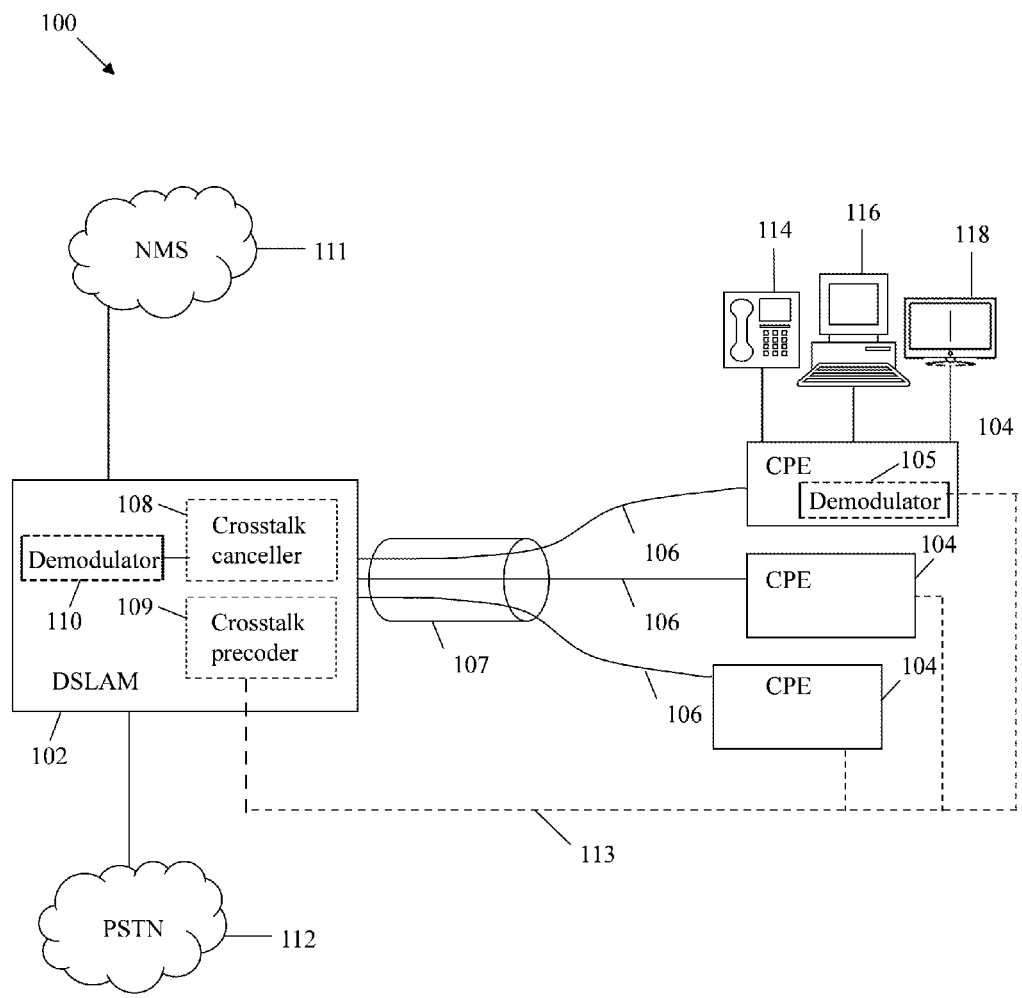
FIG. 1 is a schematic diagram of an embodiment of a DSL system.

FIG. 1 illustrates a schematic diagram of an embodiment of a DSL system 100, in which disclosed FEXT estimation schemes may be implemented. The DSL system 100 may be a VDSL2 system, an ADSL2 system, an ADSL2+ system, or any other DSL system (e.g., systems to be defined in the ITU-T G.fast standard). The DSL system 100 may comprise a DSLAM 102 and a plurality of CPEs 104, which may be coupled to the DSLAM 102 via a plurality of subscriber lines 106. The DSLAM 102 may be located on an operator end of the DSL system 100, such as a central office (CO), an exchange, a distribution center, and a cabinet. The CPEs 104 may be located on a remote or subscriber end. At least some of the subscriber lines 106 may be bundled in a binder 107. In an embodiment, the DSLAM 102 comprises a crosstalk canceller 108, which may be configured to reduce or cancel upstream FEXT, and a crosstalk precoder (or vector precoder) 109, which may be configured to reduce or cancel downstream FEXT. The canceller 108 may be coupled to a demodulator 110, which may comprise a FEQ and a constellation decoder. In estimation of upstream FEXT channels, the demodulator 110 may be configured to generate error signals based on an upstream signal, which is induced by upstream FEXT. The crosstalk precoder 109 may pre-distort downstream signals, which are then transmitted downstream to the CPEs 104 via the subscriber lines 106.

Each of the CPEs 104 may comprise a demodulator 105, which may be configured to equalize the downstream signals and generate an error signal comprising error vectors. The demodulator 105 may be coupled to the crosstalk precoder 109 via a plurality of feedback channels 113. Feedback symbols comprising the error signal may be transmitted from a CPE 104 to the DSLAM 102. The feedback channels 113 (shown in dotted lines) may correspond to upstream logical data paths from the CPEs 104 to the DSLAM 102 and may not be physically separated from the subscriber lines 106 (shown in solid lines). The CPEs 104 may transmit the error feedback signals in the feedback channels 113 through the subscriber lines 106 to a plurality of corresponding receivers in the DSLAM 102, which may then extract the error signals from the upstream data stream. Additionally, the DSLAM system 102 may optionally comprise a network management system (NMS) 111 and a public switched telephone network (PSTN) 112. The NMS 111 may be a network management infrastructure that processes data exchanged with the DSLAM 102 and may be coupled to one or more broadband networks, such as the Internet. The PSTN 112 may be a network that generates, processes, and receives voice or other voice-band signals.

The crosstalk precoder 109 may be configured to reduce or limit the crosstalk in the lines. The crosstalk precoder 109 may transmit pre-distorted downstream signals in the subscriber lines 106 to cancel or reduce crosstalk error in the lines. The crosstalk precoder 109 may process a plurality of downstream signals from a transmitter in the DSLAM 102, add distortion to the downstream signals, and transmit the pre-distorted downstream signals to the CPEs 104 via the subscriber lines 106. The pre-distorted signals may be generated by the crosstalk precoder 109 whose parameters are properly chosen to minimize the crosstalk in the downstream channels. In order for the crosstalk precoder to select the appropriate parameters, the CPEs 104 may send back the error signals in the downstream receivers as feedback for the precoder 109 to estimate downstream crosstalk and update its parameters. For instance, a plurality of transceivers at the CPEs 104 may measure the errors for a plurality of received symbols (e.g. DMT symbols) from the crosstalk precoder 109, and transmit back to the DSLAM a plurality of corresponding error feedback signals, via the feedback channel 113. The feedback channel 113 may be established through upstream data signal paths from the CPEs 104 to the DSLAM 102, which may be provided in addition to upstream communications data.

In other embodiments, the DSLAM 102 may be modified to include splitters, filters, management entities, and various other hardware, software, and functionality. For example, the DSLAM 102 may comprise switches and/or splitters, which may couple the NMS 111, the PSTN 112, and the subscriber lines 106. For instance, the splitter may be a 2:1 coupler that forwards data signals received from the subscriber lines 106 to the NMS 111 and the PSTN 112, and forwards data signals received from the NMS 111 and the PSTN 112 to the subscriber lines 106. Further, the splitter may optionally comprise one or more filters to help direct data signals between the NMS 111, the PSTN 112, and the subscriber lines 106. Additionally, the DSLAM 102 may comprise at least one DSL transmitter/receiver (transceiver), each of which is referred to as an xTU-C. The xTU-C (e.g., a master modem) may exchange signals between the NMS 111, the PSTN 112, and the subscriber lines 106.

In an embodiment, the CPEs 104 may be located at the customer premises, where at least some of the CPEs 104 may be coupled to a telephone 114, a computer 116, and/or a television 118. The telephone 114 may be hardware, software, firmware, or combinations thereof that generates, processes, and receives voice or other voice-band signals. The CPE 104 may comprise a switch and/or a splitter, which may couple the subscriber lines 106 and the telephone 114, the computer 116, and the television 118.

Depending on the supported standard, the DSL system 100 may be referred to as an xDSL system, where 'x' may indicate any DSL standard. For instance, 'x' stands for 'A' in ADSL2 or ADSL2+ systems, and 'x' stands for 'V' in VDSL or VDSL2 systems. When a transceiver in the DSL system 100 is located in a CO, the transceiver may be referred to as an xTU-C. In practice, as long as the transceiver is located at an operator end of the loop (including a CO, exchange, or cabinet), it may be referred to as an xTU-C. On the other hand, when a transceiver in the DSL system 100 is located at a remote or user end such as a customer premise, the transceiver may be referred to as an xTU-R. For example, if the DSL system 100 is a VDSL2 system, a CO transceiver may then be referred to as a VDSL2 transceiver unit (VTU) at an optical network unit (VTU-O). Sometimes, a VTU-O may also be referred to as a VTU at a central office (VTU-C). Similarly, in the VDSL2 system, a CPE transceiver may be referred to as a VTU at a remote terminal (VTU-R).

Figure 2:
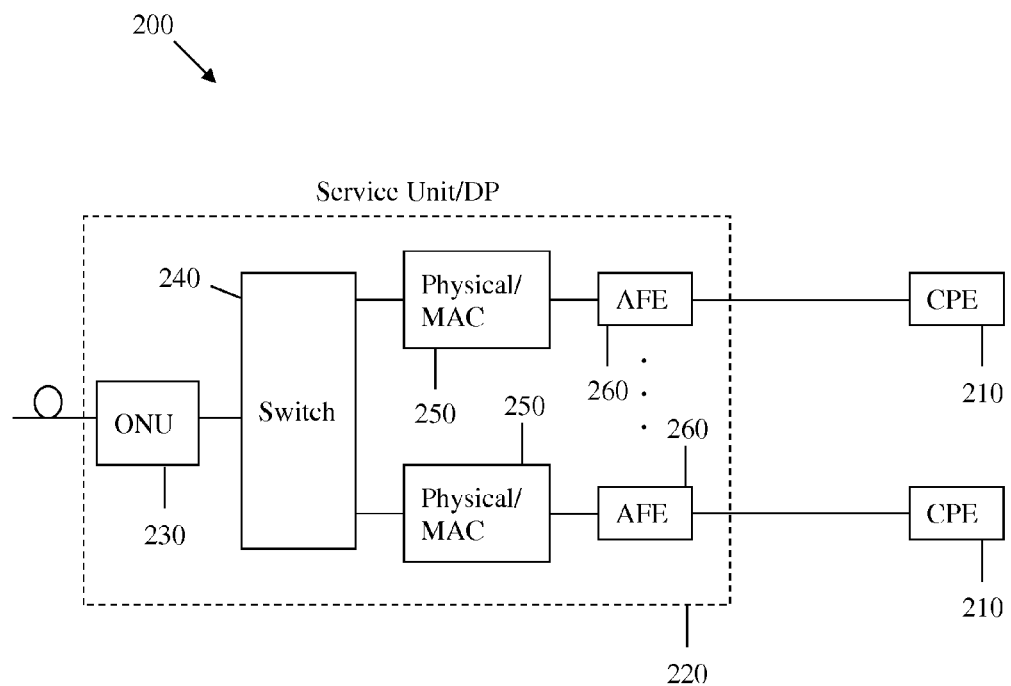
FIG. 2 is a schematic diagram of an embodiment of a system architecture.

FIG. 2 shows an embodiment of a system architecture 200, which may use, e.g., the G.fast standard. A plurality of CPEs 210 may be coupled to a service unit or drop-point (DP) 220 via subscriber lines, which may provide signal channels. The DP 220 may be a DSLAM. The DP 220 may comprise an optical network unit (ONU) 230, a switch 240, physical/ media access control (MAC) layers 250, and analog front ends (AFEs) 260. In the G.fast standard, transmissions of all channels may be in a synchronous time division duplex (STDD) mode. The components of the system architecture 200 may be similar to the corresponding components of the DSL system 100 with the same name.

Figure 3:
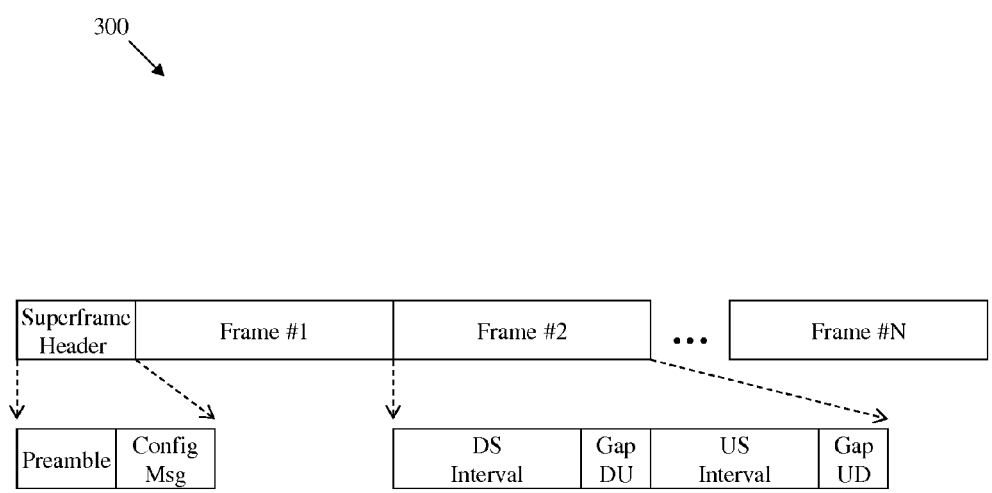
FIG. 3 is a diagram of an embodiment of a superframe structure.

FIG. 3 illustrates an embodiment of a superframe structure 300, which may be received by a DSL receiver or transmitted by a DSL transmitter. Suppose, for the purpose of illustration, that the superframe structure 300 is being transmitted by a transmitter over a time duration or period. In this case, the transmitter may be configured to first transmit a superframe header, which may comprise a preamble and a configuration message (denoted as config msg). The preamble may comprise one or more preamble symbols, and the configuration message may comprise at least one configuration symbol. Then, the transmitter may be configured to transmit N frames, where N is a positive integer, including Frame #1, Frame #2, ..., Frame #N sequentially arranged as shown in FIG. 3. If desired, the superframe header may also be combined into the Frame #1. In an embodiment, a time duration for each of the N frames may be the same. Further, a time duration for each frame may be further divided into a downstream (DS) interval, a gap for switching from downstream to upstream (denoted as GapDU), an upstream (US) interval, and a gap for switching from upstream to downstream (denoted as GapUD). Each of the intervals and gaps in a frame (e.g., the Frame #2) may comprise at least one time slot, and a duration of the at least one time slot may be no shorter than an orthogonal frequency-division multiplexing (OFDM) symbol.

In an embodiment, a total number of OFDM symbols for each frame is the same. Furthermore, when the transmitter is located in a DSLAM (e.g., the DSLAM 102 in FIG. 1) or DP (e.g., the DP 220 in FIG. 2), which is coupled to a plurality of subscriber lines, a superframe transmitted onto each subscriber line may have an equal number of frames (e.g., N=256 for all subscriber lines). Each superframe may have the same frame structures. In addition, all superframe boundaries may be aligned in time. For example, transmission of a superframe header onto a first subscriber line may occur at the same time as transmission of a corresponding superframe header onto a second subscriber line.

In an embodiment of a normal data transmission mode, a transmitter may be configured to transmit data symbols carrying data frames in the downstream and upstream intervals. Additionally, in a low power mode, the transmitter may transmit quiet or muted symbols in the downstream and upstream intervals. A quiet symbol may be a virtual symbol, as some or all components of the transmitter may actually be turned off during the quiet symbol, thus no data is actually transmitted. It should be noted that, although only working principles of a transmitter is described in regard to FIG. 3, one skilled in the art may similarly apply the working principles to a receiver.

Figure 4:
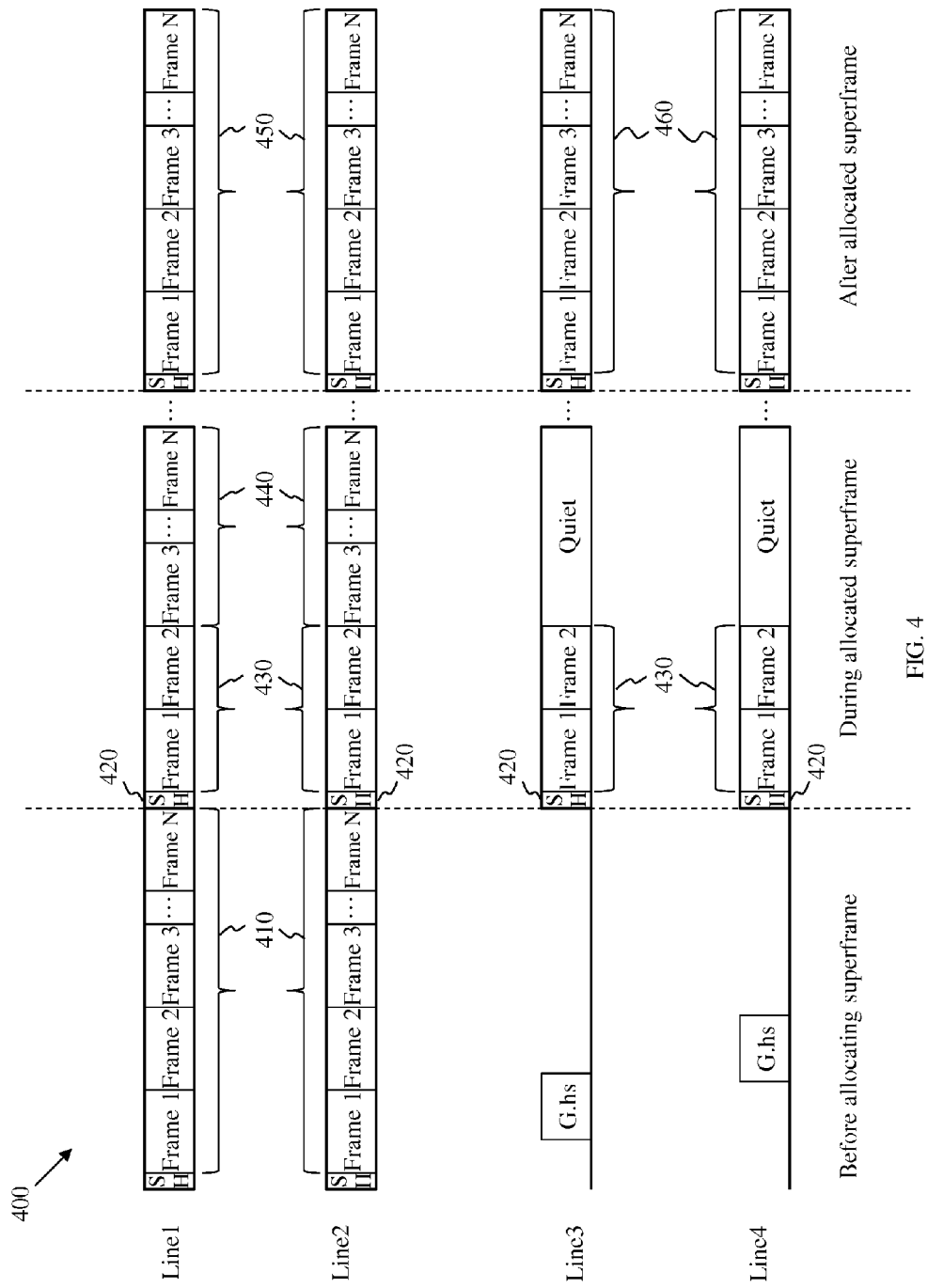
FIG. 4 is a schematic diagram of an embodiment of an online reconfiguration (OLR) procedure.

FIG. 4 illustrates an embodiment of an online reconfiguration (OLR) procedure 400, which may be implemented in a DSL system (e.g., the DSL system 100 in FIG. 1) to estimate FEXT channels (and perform other tasks if desired). For the purpose of illustration, suppose there are two subscriber lines which have finished initialization and entered showtime (referred to as showtime lines), while two additional subscriber lines (referred to hereafter as joining lines) are attempting to join the showtime lines. In FIG. 4, two showtime lines are denoted as Line 1 and Line 2, while two joining lines are denoted as Line 3 and Line 4. It should be noted that any suitable number of subscriber lines may be present in the DSL system. For example, at a minimum, there may be one showtime line and one joining line. In implementation, one end of the four lines may be coupled to a common DSLAM transceiver, while the other end of the four lines may be coupled to separate CPE transceivers. Further, each of the four lines may be capable of communicating superframes between the DSLAM and CPE transceivers. Each superframe may comprise a superframe header (denoted as SH in FIG. 4) and N frames (i.e., Frame 1 to Frame N). Reference to a subscriber line as a showtime line or a joining line is meant to refer to a state of the subscriber line during a relevant time period. The state of a line may change from one time to another. For example, a joining line may become a showtime line.

Before entering showtime, the two joining lines may go through an initialization process. The initialization process may comprise, e.g. in the VDSL2 standard, four phases including a handshake phase, a channel discovery phase, a training phase, and a channel analysis and exchange phase. Detailed procedures of the handshake phase are described in the ITU-T Recommendation G.994.1 (also referred to as G.hs) entitled "Handshake Procedures for Digital Subscriber Line (DSL) Transceivers", which is incorporated herein by reference. The detailed procedures in G.994.1 may be applicable to VDSL2 or another DSL standard. In the handshake phase, superframe parameters (e.g., number of frames, number of symbols in each frame, etc.) may be exchanged between an xTU-C and an xTU-R. Line 3 and Line 4 may start the initiation process at a same time or at different times. While Line 3 and/or Line 4 are in the initiation process, Line 1 and/or Line 2 may communicate data frames 410 in a downstream or upstream direction.

After completion of the initiation process, Line 3 and Line 4 may enter the showtime stage. At any given time, a processor or controller located in a DSLAM or DP may be configured to allocate or dedicate a plurality of time slots for estimation of FEXT channels. The process may be coupled to a transceiver or located in a transceiver. Prior to allocation of time slots, Line 3 and/or Line 4 may align their superframe boundaries with Line 1 and/or Line 2. For example, all superframe headers 420 may be aligned such that they are transmitted or received at the same time. Then, through superframe header messages or other control messages, the DP or DSLAM may instruct all 4 lines to free up the plurality of time slots. A length of the time slots may correspond to one or more frames, such as first two frames (i.e., Frame 1 and Frame 2) 430 of a superframe shown in FIG. 4. Note that any other frame may also be allocated if desired.

In an embodiment, the plurality of time slots may be allocated dynamically. For example, through online reconfiguration or other communication messages exchanged between the DSLAM and corresponding CPEs, time intervals within each superframe may be allocated as the plurality of time slots. After FEXT estimation is done, the time intervals may be released for normal use. In an alternative embodiment, the plurality of time slots may be configured or determined by the DSLAM from the beginning. For example, the time slots may be pre-defined in training sequences, which may be exchanged between the DSLAM and a corresponding CPE. If a fixed part of the superframe structure (e.g., first two frames) is pre-determined to dedicate for FEXT estimation according to a DSL standard, no message exchange may be needed.

In the allocated time slots, training symbols and feedback symbols may be communicated between two transceivers. Further, a level of downstream or upstream FEXT from a disturber line into a victim line may be estimated, the process of which will be further described below. Since FEXT may occur between any of the present lines, the disturber line may be a showtime or joining line, and the victim line may also be a showtime or joining line. Other tasks, such as precoder and/or canceller training, signal to noise ratio (SNR) measurement, may also be conducted.

Following the allocated time slots, the superframe may carry any data in its remaining frames 440. For example, the frames 440 may resume to transmit user data. During a time of the remaining frames, the joining lines may stay quiet. Although FIG. 4 shows only one superframe containing allocated frames, it should be noted that, if desired, multiple superframes may be configured to contain allocated frames. In implementation, the allocation of time slots or frames may last until all intended purposes are completed. Upon completion of the intended purposes, showtime lines may be reconfigured (e.g., via OLR) back to a normal mode, in which user data may be transmitted in frames 450. In addition, joining lines may be configured to use frames 460 to perform other necessary training(s), such as normal FEXT-free training, equalizer training, etc.

In implementation, once the dedicated time slots are set up through the OLR procedure 400, FEXT channel estimation may be done in various approaches. For example, in one approach, if downstream FEXT from multiple disturber lines into one victim line is being estimated, one or more DSLAM transceivers coupled to all disturber lines may send training symbols (e.g., orthogonal pilot sequences) in a same plurality of allocated time slots (in one superframe). On the other end, a CPE transceiver coupled to the victim line may receive multiple downstream signals, each of which has a component induced by FEXT from a disturber line. An error signal may be generated by a demodulator in the CPE transceiver based on each downstream signal. Further, each error signal may be packed into a feedback symbol, which is then sent by the CPE transceiver back to the DSLAM transceiver. As a result, there may be a large amount of feedback symbols from the CPE. Although this approach may allow a relatively fast estimation time, data traffic caused by feedback symbols from the CPE to DSLAM may be high.

For example, in another approach, time division multiple access (TDMA) may be used. In this case, if downstream FEXT from multiple disturber lines into one victim line is being estimated, each DSLAM transceiver coupled to a disturber line may send its training symbols in allocated time slots of different superframes. On the other end, a CPE transceiver coupled to the victim line may receive multiple downstream signals, each of which has a component induced by FEXT from a disturber line. An error signal may be generated by a demodulator in the CPE transceiver based on each downstream signal. Then, instead of sending back multiple feedback symbols corresponding to multiple disturber lines, the CPE may average multiple error signals to generate an averaged error signal. Then, the averaged error signal may be packed into a feedback symbol and sent back by the CPE. This approach may reduce an amount of data traffic needed.

Figure 5:
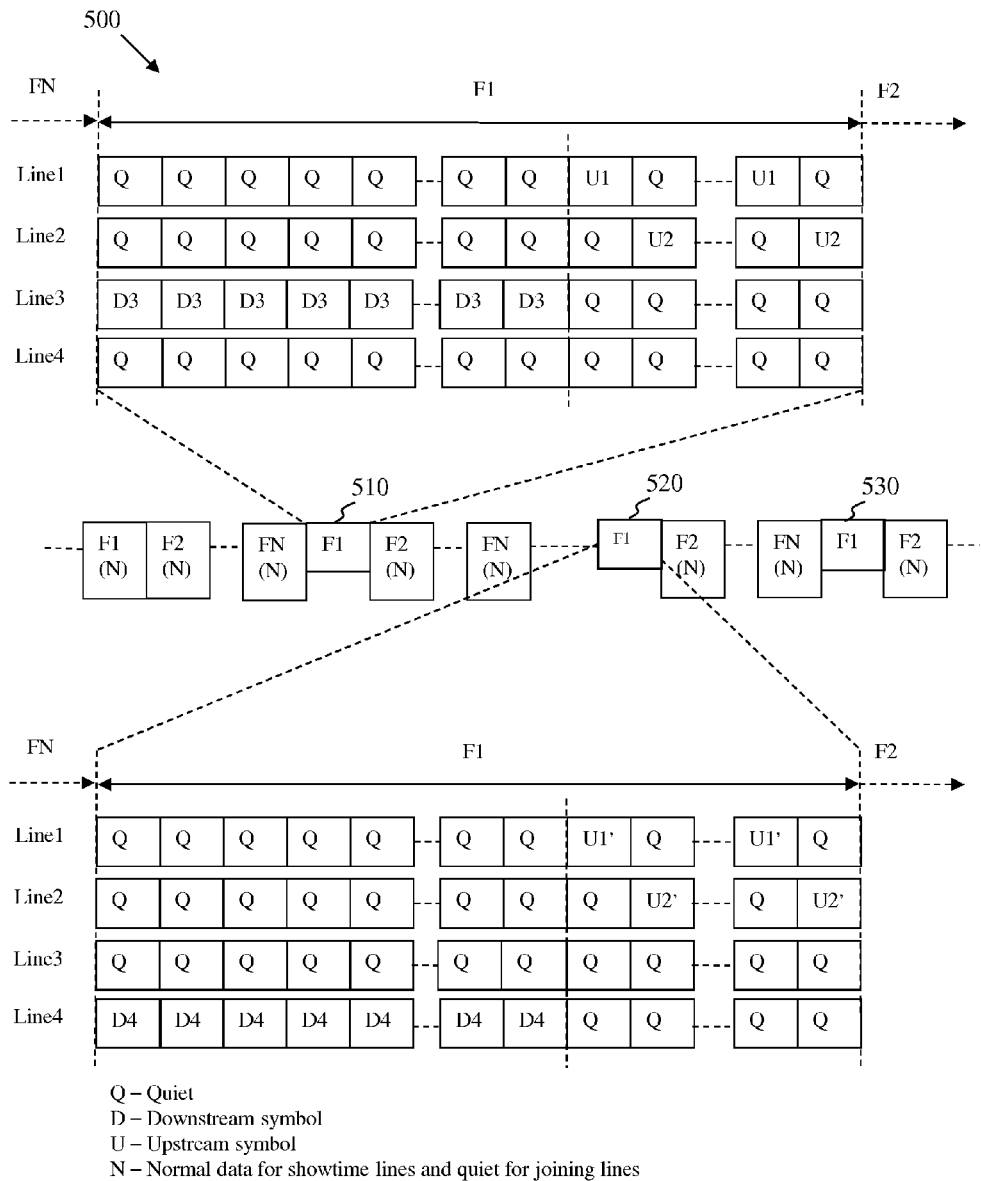
FIG. 5 is a schematic diagram of an example of a downstream FEXT estimation scheme.

FIG. 5 illustrates an example of a downstream FEXT estimation scheme 500, which may be implemented in a DSL system (e.g., the DSL system 100 in FIG. 1). In the downstream FEXT estimation scheme 500, F1 denotes Frame #1, F2 denotes Frame #2, . . . , and FN denotes Frame #N. A duration of each frame including F1 comprises a plurality of time slots. In this example, only F1 is allocated as the frame for downstream FEXT training, although other frames may also be allocated if desired. During F2 to FN, showtime lines may communicate normal data symbols, and joining lines may stay quiet. In the interest of clarity, certain details, such as superframe headers, GapDU, GapUD, and control message exchanges, are not shown in FIG. 5. Similar to FIG. 4, four lines are shown in the downstream FEXT estimation scheme 500 for purpose of illustration, although similar principles may be applied to any other suitable number of lines. Two showtime lines are denoted as Line 1 and Line 2, while two joining lines are denoted as Line 3 and Line 4. Further, a quiet symbol is denoted as Q, a downstream training symbol as D3 or D4, and an upstream feedback symbol as U1, U2, U1', or U2'. Outside the allocated frame, a normal data symbol for a showtime line or a quiet symbol for a joining line is denoted as N.

In implementation, Line 1 and Line 2 may have completed its initialization process and entered a steady state data flows between CO and CPE. Line 3 and Line 4 may be in an initiation stage. A joining line may introduce downstream FEXT into a showtime line, in which case the joining line is a disturber line and the showtime line is the victim line. On the other hand, a showtime line may also introduce downstream FEXT into a joining line, in which case the showtime line is a disturber line and the joining line is the victim line. The downstream FEXT estimation scheme 500 estimates a level of downstream FEXT introduced from the joining lines into the showtime lines.

In a first superframe, F1 510 may be allocated to estimate downstream FEXT from Line 3 into Line 1 and Line 2. A duration of the F1 510 may successively comprise a first, second, and third periods, each of which may comprise at least one time slot. A training symbol may be communicated between two transceivers in each time slot. As shown in FIG. 5, in the first period, a DSLAM or DP transceiver coupled to Line 3 may send a plurality of D3 symbols to a CPE transceiver coupled to Line 3. Meanwhile, Lines 1, 2, and 4 may stay quiet. The D3 symbols may introduce downstream FEXT into Line 1 and Line 2. During the first period, a CPE transceiver coupled to Line 1 may receive a downstream signal, which may comprise a component induced by the downstream FEXT from Line 3. There may be a switching gap between the first and second periods, and during the switching gap, a demodulator located in the CPE transceiver coupled to Line 1 may generate an error signal based on the downstream signal.

In the second period, the CPE transceiver coupled to Line 1 may transmit at least one U1 symbol comprising the error signal to a DSLAM transceiver coupled to Line 1. Meanwhile, Lines 2, 3, and 4 may stay quiet. In an embodiment, only one U1 symbol may be needed, since its error signal may be an averaging of error signals generated based on the D3 symbols. The DSLAM transceiver coupled to Line 1 may comprise or further couple to a processor, which may then use the U1 symbol to estimate a level of downstream FEXT from Line 3 into Line 1. Similarly, in the third period, a CPE transceiver coupled to Line 2 may send an U2 symbol to a DSLAM transceiver coupled to Line 2. Meanwhile, Lines 1, 3, and 4 may stay quiet. The U2 symbol may be based on downstream FEXT induced from Line 3 to Line 2. There may be variations regarding timing of the symbols. For example, if desired, the U1 and/or U2 symbols may be sent back to the DSLAM as a normal data symbol in any of F2 to FN. For another example, the U1 and U2 symbols may be sent back in the F1 510 in an overlapped mode with small constellation, in which U1 and U2 symbols may be sent simultaneously instead of successively.

Similar to the first superframe, in a second superframe, F1 520 may be allocated to estimate downstream FEXT from Line 4 into Line 1 and Line 2. Since the F1 510 and the F1 520 are successive in time, this approach of estimating FEXT per disturber line at a time may be referred to as a TDMA approach. Since the effect of each disturber line is separated in time, estimation of FEXT channels may be relatively more accurate, which leads to higher performance of FEXT cancellation later.

Similar to the F1 510, a duration of the F1 520 may successively comprise a first, second, and third periods, each of which may comprise at least one time slot. A training symbol may be communicated between two transceivers in each time slot. As shown in FIG. 5, in the first period, a DSLAM or DP transceiver coupled to Line 4 may send a plurality of D4 symbols to a CPE transceiver coupled to Line 4. Meanwhile, Lines 1, 2, and 3 may stay quiet. The D4 symbols may introduce downstream FEXT into Line 1 and Line 2. During the first period, the CPE transceiver coupled to Line 1 may receive a downstream signal, which may comprise a component induced by the downstream FEXT from Line 4. There may be a switching gap between the first and second periods, and during the switching gap, a demodulator located in the CPE transceiver coupled to Line 1 may generate an error signal based on the downstream signal.

In the second period, the CPE transceiver coupled to Line 1 may transmit at least one U1' symbol comprising the error signal to the DSLAM transceiver coupled to Line 1. Meanwhile, Lines 2, 3, and 4 may stay quiet. In an embodiment, only one U1' symbol may be needed, since its error signal may be an averaging of error signals generated based on the D4 symbols. The DSLAM transceiver coupled to Line 1 may comprise or further couple to a processor, which may then use the U1' symbol to estimate a level of downstream FEXT from Line 4 into Line 1. Similarly, in the third period, the CPE transceiver coupled to Line 2 may send an U2' symbol to the DSLAM transceiver coupled to Line 2. Meanwhile, Lines 1, 3, and 4 may stay quiet. The U2 symbol may be based on downstream FEXT induced from Line 4 to Line 2. There may be variations regarding timing of the symbols. For example, if desired, the U1' and/or U2' symbols may be sent back to the DSLAM as a normal data symbol in any of following F2 to FN. For another example, the U1' and U2' symbols may be sent back in the F1 520 simultaneously instead of successively.

During allocated frame(s) such as the F1 510 or the F1 520, additional tasks or purposes may also be performed. During the F1 510, for example, when D3 symbols are transmitted downstream, the CPE transceiver coupled to Line 3 may be configured to perform FEXT-free equalizer training, since other lines may stay quiet. After its equalizer is trained, the CPE transceiver may then at a later time estimate downstream FEXT induced from other lines (i.e., Lines 1, 2, and 4) into Line 3. For another example, after estimating the downstream FEXT from Line 3 to Line 1, channel parameters (sometimes denoted as H) may be computed, which may then be used for training of a precoder in the DSLAM. After training, the precoder may appropriately distort downstream data symbols to offset effects of downstream FEXT from Line 3 to Line 1. Moreover, other features such as FEXT-free SNR measurement, data rate negotiation, alien noise measurement, may be performed on the lines. These additional tasks may be similarly performed in the F1 520.

After estimating downstream FEXT from joining lines to showtime lines, downstream FEXT from showtime lines to joining lines may be similarly performed in more allocated frames such as the F1 530. In this case, to generate accurate error signals based on downstream FEXT, the joining lines may first need to train their equalizers. One skilled in the art will understand how to estimate downstream FEXT from showtime lines to joining lines using principles of the present disclosure, thus these details procedures will not be further described.

Figure 6:
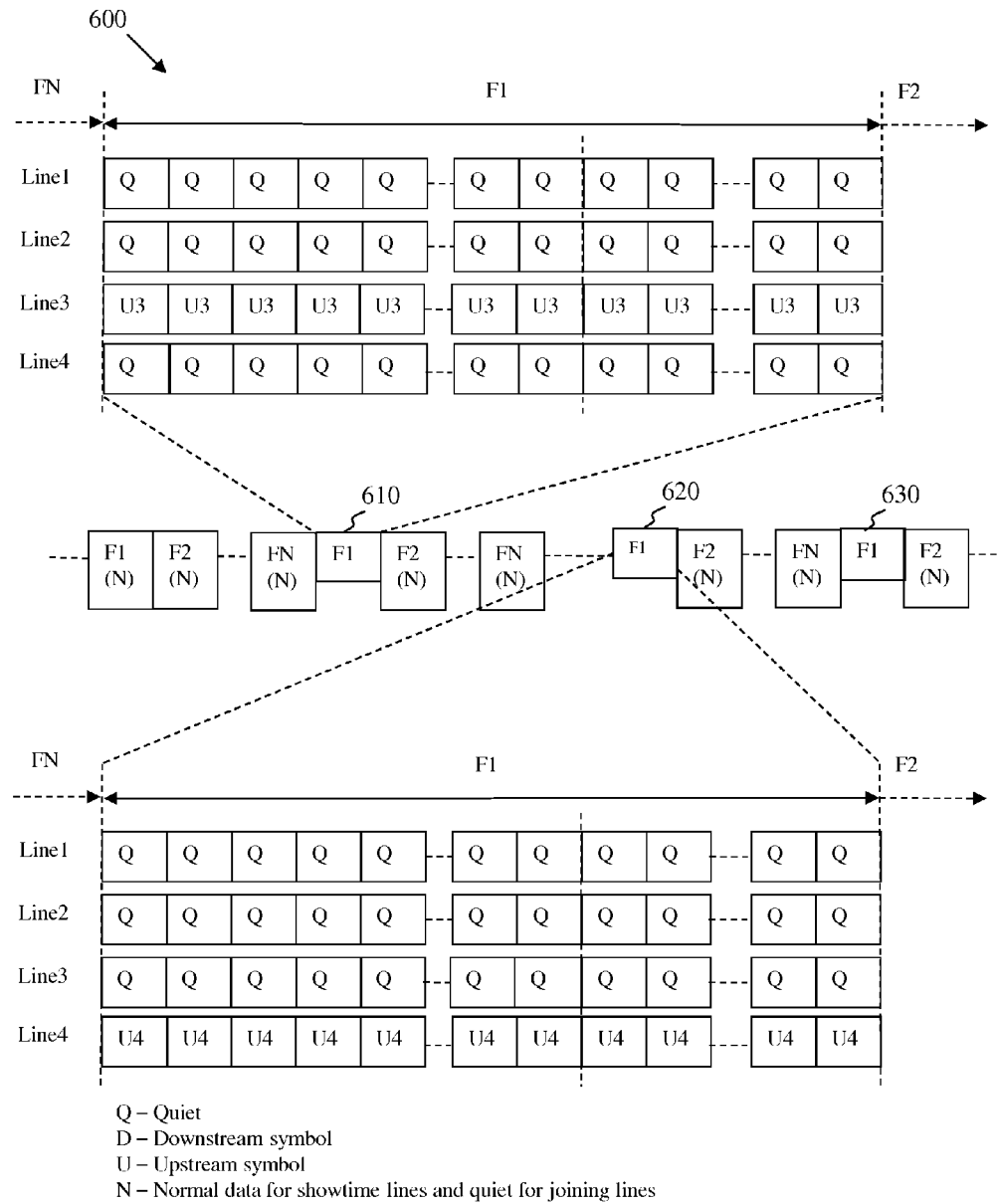
FIG. 6 is a schematic diagram of an example of an upstream FEXT estimation scheme.

FIG. 6 illustrates an example of an upstream FEXT estimation scheme 600, which may be implemented in a DSL system (e.g., the DSL system 100 in FIG. 1). Some aspects of the upstream FEXT estimation scheme 600 may be the same as or similar to the downstream FEXT estimation scheme 500, thus these aspects will not be further described in the interest of conciseness. In the upstream FEXT estimation scheme 600, an upstream training symbol is denoted as U3 or U4.

In a first superframe, F1 610 may be allocated to estimate upstream FEXT from Line 3 into Line 1 and Line 2. A duration of the F1 610 may comprise a plurality of time slots, at least part of which may be allocated to transmit upstream training symbols. As shown in FIG. 6, a CPE transceiver coupled to Line 3 may send a plurality of U3 symbols to a DSLAM or DP transceiver coupled to Line 3. Meanwhile, Lines 1, 2, and 4 may stay quiet. The U3 symbols may introduce upstream FEXT into Line 1 and Line 2. Then, a DSLAM transceiver coupled to Line 1 may receive an upstream signal, which may comprise a component induced by the FEXT from Line 3. In an embodiment, a demodulator located in the DSLAM transceiver coupled to Line 1 may generate an error signal based on the upstream signal. The DSLAM transceiver coupled to Line 1 may comprise or further couple to a processor, which may then use the error signal to estimate a level of upstream FEXT from Line 3 into Line 1.

Similarly, a DSLAM transceiver coupled to Line 2 may also receive an upstream signal, which may comprise a component induced by the FEXT from Line 3. In an embodiment, a demodulator located in the DSLAM transceiver coupled to Line 2 may generate an error signal based on the upstream signal. The DSLAM transceiver coupled to Line 2 may comprise or further couple to a processor, which may then use the error signal to estimate a level of upstream FEXT from Line 3 into Line 2.

Similar to the first superframe, in a second superframe, F1 620 may be allocated to estimate FEXT from Line 4 into Line 1 and Line 2. Since the F1 610 and the F1 620 are successive in time, this approach of estimating FEXT per disturber line at a time may be referred to as a TDMA approach. Similar to the F1 610, a duration of the F1 620 may comprise a plurality of time slots, at least part of which may be allocated to transmit upstream training symbols. As shown in FIG. 6, a CPE transceiver coupled to Line 4 may send a plurality of U4 symbols to a DSLAM or DP transceiver coupled to Line 4. Meanwhile, Lines 1, 2, and 3 may stay quiet. The U4 symbols may introduce upstream FEXT into Line 1 and Line 2.

Then, the DSLAM transceiver coupled to Line 1 may receive an upstream signal, which may comprise a component induced by the FEXT from Line 4. In an embodiment, the demodulator located in the DSLAM transceiver coupled to Line 1 may generate an error signal based on the upstream signal. The processor of the DSLAM transceiver coupled to Line 1 may then use the error signal to estimate a level of upstream FEXT from Line 4 into Line 1. Unlike the downstream FEXT estimation scheme 500, no feedback symbol may be needed in the upstream case.

Similarly, in the F2 620, a DSLAM transceiver coupled to Line 2 may also receive an upstream signal, which may comprise a component induced by the FEXT from Line 4. In an embodiment, the demodulator located in the DSLAM transceiver coupled to Line 2 may generate an error signal based on the upstream signal. The processor of the DSLAM transceiver coupled to Line 2 may then use the error signal to estimate a level of upstream FEXT from Line 4 into Line 2.

During allocated frame(s) such as the F1 610 or the F1 620, additional tasks or purposes may also be performed. During the F1 610, for example, after estimating the upstream FEXT from Line 3 into Line 1, the processor of the DSLAM transceiver coupled to Line 1 may be further configured to compute channel parameters, which may then be used for training of a canceller in the DSLAM. After training, the canceller may appropriately correct upstream data symbols to remove effects of upstream FEXT from Line 3 to Line 1. For another example, FEXT-free SNR measurement may also be performed on the lines. These additional tasks may be similarly performed in the F1 620.

After estimating upstream FEXT from joining lines to showtime lines, upstream FEXT from showtime lines to joining lines may be similarly performed in more allocated frames such as the F1 630. One skilled in the art will understand how to estimate upstream FEXT from showtime lines to joining lines using principles of the present disclosure, thus these details procedures will not be further described.

The schemes and procedures described with regard to FIGS. 4-6 may estimate upstream/downstream FEXT from one disturber line to multiple victims in one frame (F1) of each superframe. In this case, error feedback in each victim line for each superframe may contain all tones or subscribers corresponding to that disturber. In an embodiment, if desired, FEXT effects from multiple disturber lines may be estimated in one frame (e.g., F1) by dividing a plurality of subcarriers into subgroups so that each frame may estimate one subgroup. Further, if desired, a smaller number of symbols may be used for each disturber such that estimation of FEXT may be completed in one frame.

Further, if frequency division multiple access (FDMA) instead of TDMA is used in the allocated frame(s) such as F1, training symbols in different disturber lines may be communicated between two transceivers at the same time. For example, D3 and D4 symbols may be transmitted at the same time, but each in different frequency bands or subcarriers. One skilled in the art would recognize that similar schemes and procedures may be used in the case of FDMA without departing from the principles of the present disclosure.

Although schemes and procedures described with regard to FIGS. 4-6 illustrate only show four subscriber lines, one skilled in the art would recognize that, for a general case comprising M subscriber lines, where M is an integer greater than one, similar schemes and procedures may be applied without departing from the principles of the present disclosure. If a third joining line is present, in FIG. 4, for example, the same plurality of time slots may also be allocated for the third joining line. For another example, in FIG. 5, an additional F1 frame may be allocated to estimate downstream FEXT from the third joining line to other lines. For yet another example, in FIG. 6, an additional F1 frame may be allocated to estimate upstream FEXT from the third joining line to other lines. Other aspects of FIGS. 4-6 may also be similarly extended to the general case of M subscriber lines.

Figure 7A:
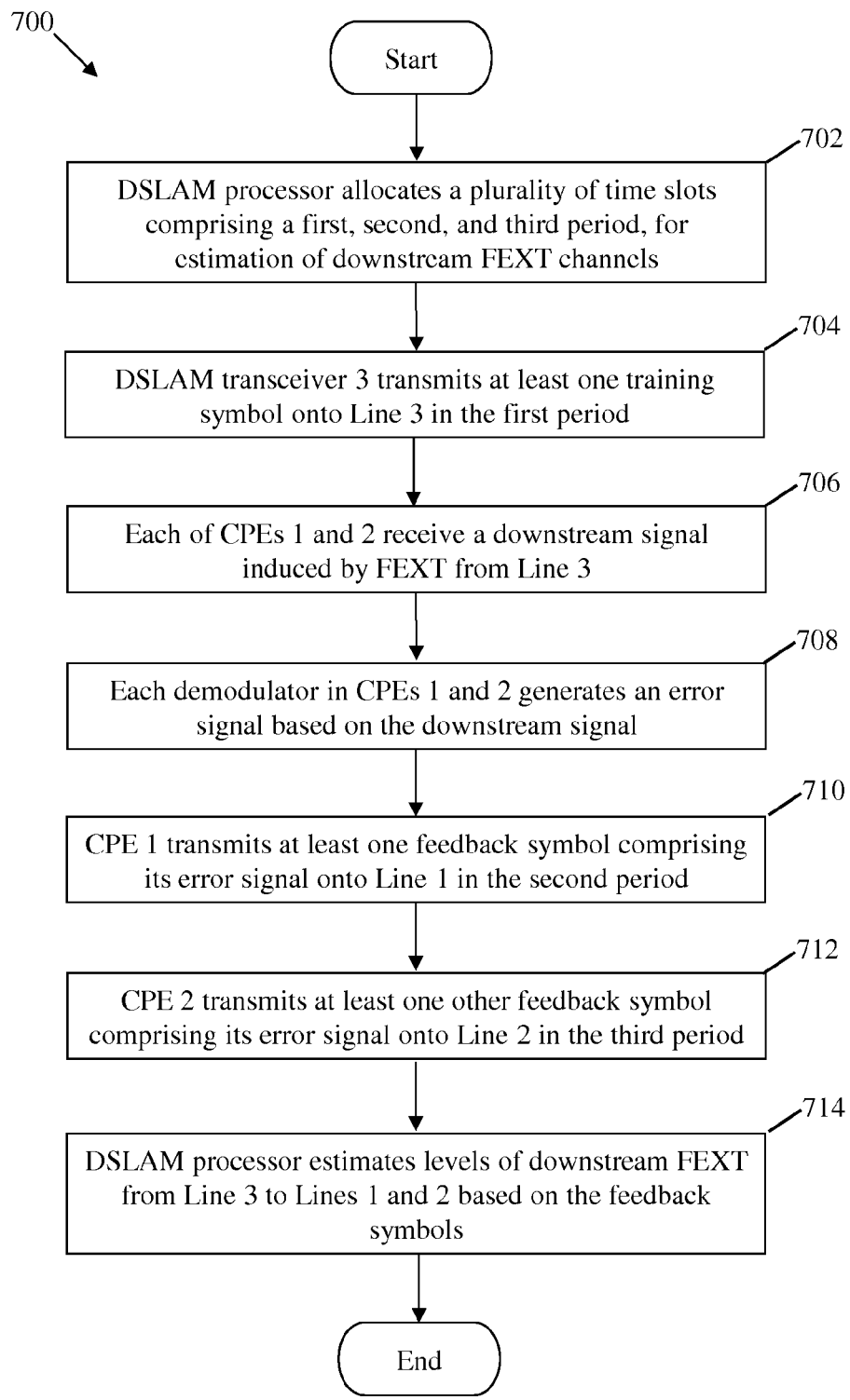
FIG. 7A is a flowchart of an embodiment of a downstream FEXT channel estimation method.

FIG. 7A illustrates an embodiment of a downstream FEXT channel estimation method 700. The method 700 may be implemented in a DSL system (e.g., the DSL system 100 in FIG. 1), which comprises a DSLAM and a plurality of CPEs. The DSLAM may comprise a plurality of transceivers, for example, including four transceivers (denoted as DSLAM transceivers 1-4), which are coupled to four subscriber lines (denoted as Lines 1-4) respectively. Another end of the four lines may be coupled to four transceivers located in four of the plurality of CPEs (the four transceivers denoted as CPEs 1-4). Suppose that Lines 1 and 2 are showtime lines, and Lines 3 and 4 are joining lines. Further, suppose that the method 700 is implemented to estimate downstream FEXT from the joining lines to the showtime lines, although it should be noted that estimation of downstream FEXT from the showtime lines into the joining lines may be similarly implemented. The method 700 may use TDMA and estimate downstream FEXT channel per disturber line at a time.

The method 700 may start in step 702, where a processor located in the DSLAM may allocate a first plurality of time slots for estimation of FEXT from Line 3 into Line 1 and Line 2. The first plurality of time slots may successively comprise a first, second, and third periods, each of which comprises at least one time slot. Next, in step 704, DSLAM transceiver 3 may transmit at least one training symbol in the first period onto Line 3, while no transmission is made on Lines 1, 2, and 4. Next, in step 706, CPE 1 may receive a downstream signal, and at least a component of the downstream signal may be induced by FEXT from Line 3 into Line 1. In the same way, CPEs 2 may also receive a downstream signal, and at least a component of the downstream signal may be induced by FEXT from Line 3 into Line 2. Next, in step 708, a demodulator in each of CPEs 1 and 2 may generate an error signal based on the corresponding downstream signal, and the error signal may be packed into at least one feedback symbol. In an embodiment, only one feedback symbol per line may be needed when an averaging scheme is used.

Next, in step 710, at least one feedback symbol may be transmitted from CPE 1 to DSLAM transceiver 1 in the second period, while no transmission is made on Lines 2-4. Next, in step 712, at least one other feedback symbol may be transmitted from CPE 2 to DSLAM transceiver 2 in the third period, while no transmission is made on Lines 1, 3, and 4. If there are more victim lines, each of the victim lines could also transmit feedback symbols one at a time. Next, in step 714, the processor in the DSLAM may estimate a level of the downstream FEXT from Line 3 into Line 1 based on the at least one feedback symbol. Similarly, the processor in the DSLAM may also estimate a level of the downstream FEXT from Line 3 into Line 2 based on the at least one other feedback symbol.

It should be understood that although the method 700 only shows an example of estimating downstream FEXT from one disturber line, in the event of multiple disturber lines (e.g., Line 4 being a second disturber line), the same or similar steps of the method 700 may be repeated to estimate downstream FEXT from Line 4 to Lines 1, 2, and 3. In an embodiment, TDMA is used and one disturber line may be estimated at a time, thus the estimation of FEXT from Line 4 may, for example, be implemented in a second plurality of time slots. The second plurality of time slots may be configured the same as or similar to the first plurality of time slots. The second plurality of time slots trails the first plurality of time slots, and they may locate in different superframes.

Further, note that the method 700 may include only a portion of steps needed to estimate the downstream FEXT channel(s), thus other steps, such as command exchanges between the DSLAM and CPEs, may also be incorporated into the method 700 wherever appropriate. Moreover, the execution order or sequence of some steps may be flexibly changed, e.g., if a step does not depend on a preceding step. In practice, there may be much more than four lines in the DSL system. One skilled in the art would be able to extend the principles disclosed herein to a general case of N subscriber lines.

Figure 7B:
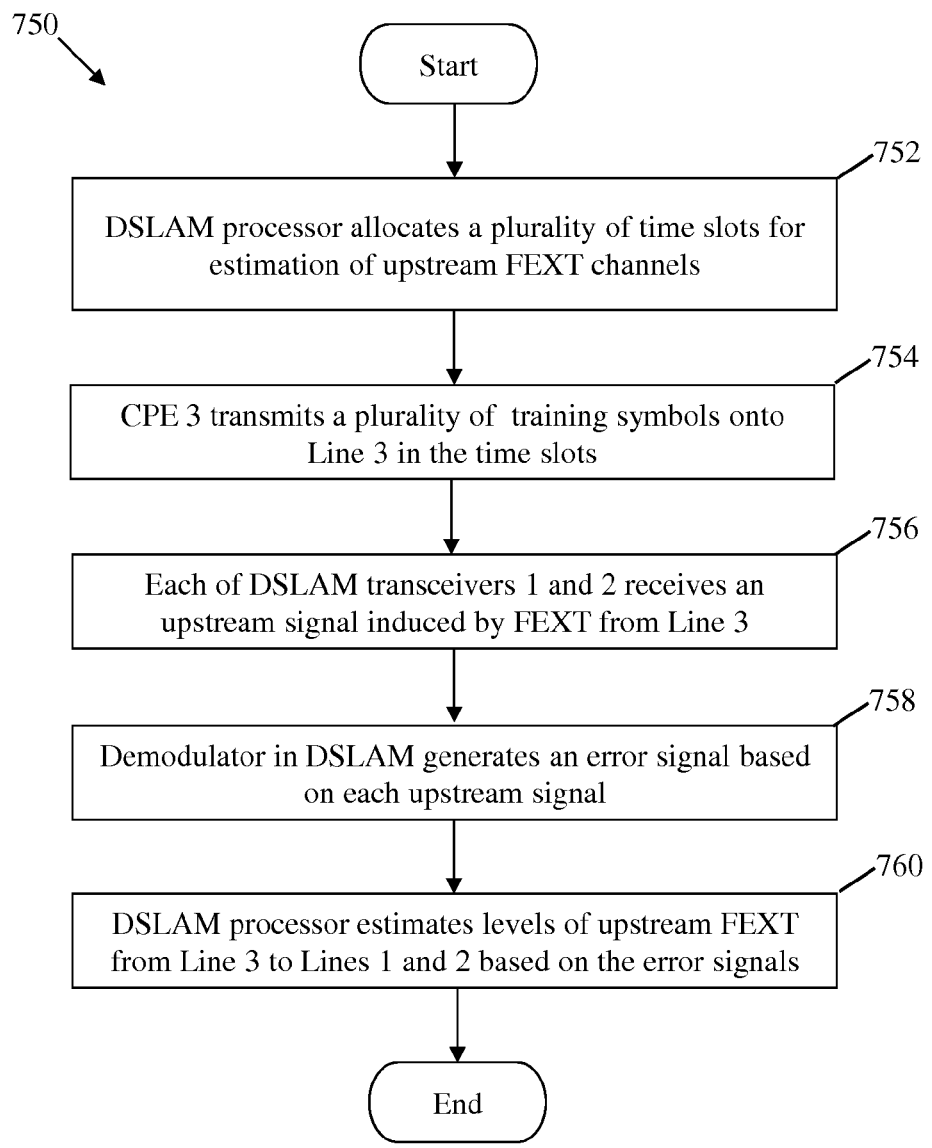
FIG. 7B is a flowchart of an embodiment of an upstream FEXT channel estimation method.

FIG. 7B illustrates an embodiment of an upstream FEXT channel estimation method 750, which may be implemented at a time different from the method 700. The method 750 may also be implemented in a DSL system (e.g., the DSL system 100 in FIG. 1), which comprises a DSLAM and a plurality of CPEs. The DSLAM may comprise a plurality of transceivers, for example, including four transceivers (denoted as DSLAM transceivers 1-4), which are coupled to four subscriber lines (denoted as Lines 1-4) respectively. Another end of the four lines may be coupled to four transceivers located in four of the plurality of CPEs (the four transceivers denoted as CPEs 1-4). Suppose that Lines 1 and 2 are showtime lines, and Lines 3 and 4 are joining lines. Further, suppose that the method 750 is implemented to estimate upstream from the joining lines to the showtime lines, although it should be noted that estimation of upstream FEXT from the showtime lines into the joining lines may be similarly implemented. The method 750 may use TDMA and estimate upstream FEXT channel per disturber line at a time.

The method 750 may start in step 752, where a processor located in the DSLAM may allocate a first plurality of time slots (different from the first plurality of time slots in the method 700) for estimation of upstream FEXT from Line 3 into Line 1 and Line 2. Next, in step 754, CPE 3 may transmit a training symbol in each of the first plurality of time slots onto Line 3, while no transmission is made on Lines 1, 2, and 4. Next, in step 756, DSLAM transceiver 1 may receive an upstream signal, and at least a component of the upstream signal may be induced by FEXT from Line 3 into Line 1. In the same way, DSLAM transceiver 2 may receive another upstream signal, and at least a component of the upstream signal may be induced by FEXT from Line 3 into Line 2. Next, in step 758, a demodulator in the DSLAM may generate an error signal based on each received upstream signal.

Next, in step 760, the processor in the DSLAM may estimate a level of the upstream FEXT from Line 3 into Line 1 based on the upstream signal. Similarly, the processor in the DSLAM may also estimate a level of the upstream FEXT from Line 3 into Line 2 based on the another upstream signal.

It should be understood that although the method 750 only shows an example of estimating upstream FEXT from one disturber line, in the event of multiple disturber lines (e.g., Line 4 being a second disturber line), the same or similar steps of the method 750 may be repeated to estimate upstream FEXT from Line 4 to Lines 1, 2, and 3. In an embodiment, TDMA is used and one disturber line may be estimated at a time, thus the estimation of FEXT from Line 4 may, for example, be implemented in a second plurality of time slots. The second plurality of time slots may be configured the same as or similar to the first plurality of time slots. The second plurality of time slots trails the first plurality of time slots, and they may locate in different superframes.

Further, note that the method 750 may include only a portion of steps needed to estimate the upstream FEXT channel(s), thus other steps, such as command exchanges between the DSLAM and CPEs, may also be incorporated into the method 750 wherever appropriate. Moreover, the execution order or sequence of some steps may be flexibly changed, e.g., if a step does not depend on a preceding step.

Figure 8:
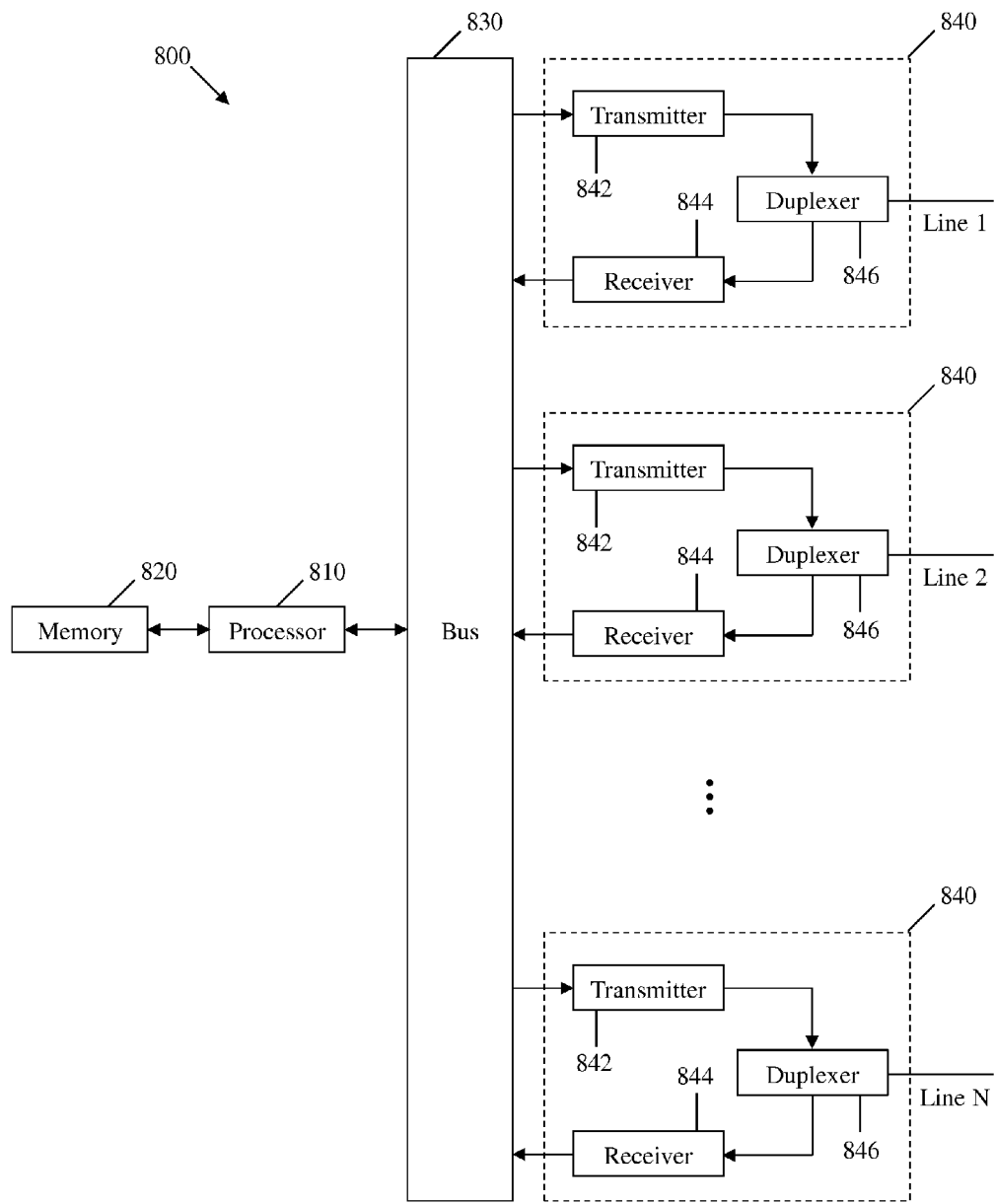
FIG. 8 is a schematic diagram of an embodiment of a DSLAM.

FIG. 8 illustrates an embodiment of a DSLAM 800, which may be suitable for implementing one or more embodiments of the methods disclosed herein, such as the OLR procedure 400, the downstream FEXT estimation scheme 500, the upstream FEXT estimation scheme 600, the downstream FEXT channel estimation method 700, and the upstream FEXT channel estimation method 750. The DSLAM 800 may comprise a processor 810, a memory 820, a bus 830, and N transceiver units 840, where N is an integer greater than one. Each transceiver unit 840 may be coupled to a subscriber line and comprise a transmitter 842, a receiver 844, and a duplexer 846.

The processor 810 (which may be referred to as a central processor unit or CPU) may be in communication with the memory 820. Although illustrated as a single processor, the processor 810 may be implemented as one or more CPU chips, one or more cores (e.g., a multi-core processor), one or more application specific integrated circuits (ASICs), and/or one or more digital signal processors (DSPs). The processor 810 may be configured to implement any of the schemes described herein, including the OLR procedure 400, the downstream FEXT estimation scheme 500, the upstream FEXT estimation scheme 600, and the FEXT channel estimation method 700. The processor 810 may be implemented using hardware, software, or both. The memory 820 may be configured to store data and program instructions. Data or program instructions stored in the memory 820 may be loaded into processor 810 to convert a general purpose processor into a special-purpose processor for implementing the schemes described herein. The memory 820 may comprise, random access memory (RAM), read only memory (ROM), and/or secondary storage (e.g., disk drive or tape drive). The bus 830 may be configured to facilitate communication between the processor 810 and the transceiver units 840. Through the bus 830, two or more of the transceiver units 840 may receive or transmit data at the same time or at different times. As an alternative embodiment, the shared bus 830 may be replaced by a switch or switching fabric connecting the processor 810 to the transceiver units 840.

Each transceiver unit 840 may be coupled a subscriber line and configured to transmit data onto or receive data from the subscriber line. For example, for Line 1 shown in FIG. 8, the transmitter 842 may be configured to send an analog signal to the duplexer 846, which may then transmit the analog signal onto Line 1. The duplexer 846 may function as a switch. In a receiving time slot, the duplexer 846 may receive an analog signal from Line 1, and relay the signal to the receiver 844.

It should be noted that FIG. 8 may include only part of all components in a DSLAM, thus other components, such as a modulator, demodulator, noise canceller, etc., may also be included separately, if they are not included in as functions of the processor 810. The transceiver units 840 may perform physical layer functions, such as modulation and demodulation (including equalization) of symbols, forward error control, etc.

Compared to the DSLAM 800, a CPE may comprise a smaller number of transceivers (e.g., one transceiver). Functioning of a CPE transceiver may be similar to the transceiver unit 840. One skilled in the art would recognize how to implement the disclosed schemes into the CPE transceiver, thus its implementation will not be further described in the interest of conciseness.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term "about" means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A digital subscriber line access multiplexer (DSLAM) configured to couple to a first subscriber line and a second subscriber line, the DSLAM comprising:
  a processor configured to allocate a plurality of time slots for downstream far-end crosstalk (FEXT) channel estimation, wherein the plurality of time slots comprises a first period and a second period, wherein the first period precedes the second period, and wherein each of the first and second periods comprises at least one time slot;
  a transmitter coupled to the processor and configured to transmit at least one training symbol in the first period onto the second subscriber line while no transmission is made on the first subscriber line; and
  a receiver coupled to the processor and configured to receive at least one feedback symbol in the second period from the first subscriber line, wherein the processor is further configured to estimate a level of downstream FEXT from the second subscriber line into the first subscriber line based on the at least one feedback symbol,
wherein the first subscriber line is a showtime line, wherein the second subscriber line is a joining line, and wherein no transmission is made on the second subscriber line in the second period.

2. The DSLAM of claim 1, further configured to couple to a third subscriber line, wherein the third subscriber line is another showtime line, wherein the plurality of time slots further comprises a third period trailing the second period, wherein the third period comprises at least one time slot, wherein no transmission is made on the third subscriber line in the first and second periods, wherein the DSLAM further comprises a second receiver coupled to the processor and configured to receive at least one other feedback symbol in the third period from the third subscriber line, and wherein the processor is further configured to estimate a level of downstream FEXT from the second subscriber line into the third subscriber line based on the at least one other feedback symbol.

3. The DSLAM of claim 1, further configured to couple to a third subscriber line, wherein the third subscriber line is another joining line, and wherein no transmission is made on the third subscriber line in the first and second periods.

4. The DSLAM of claim 3, wherein the processor is further configured to:
    allocate a second plurality of time slots; and
    estimate a level of downstream FEXT from the third subscriber line into the first subscriber line in the second plurality of time slots.

5. The DSLAM of claim 4, wherein the plurality of time slots and the second plurality of time slots correspond to different superframes.

6. The DSLAM of claim 1, further configured to couple to a third subscriber line, wherein the third subscriber line is another joining line, wherein the DSLAM further comprises a second transmitter coupled to the processor and configured to transmit at least one other training symbol in the first period onto the third subscriber line, and wherein the at least one training symbol and the at least one other training symbol are in different frequency ranges.

7. The DSLAM of claim 6, wherein the receiver is further configured to receive at least one other feedback symbol in the second period from the first subscriber line, wherein the at least one feedback symbol and the at least one other feedback symbol are in different frequency ranges, and wherein the processor is further configured to estimate a level of downstream FEXT from the third subscriber line into the first subscriber line based on the at least one other feedback symbol.

8. The DSLAM of claim 1, wherein a number of the at least one training symbol is greater than one, and wherein a number of the at least one feedback symbol equals one.

9. The DSLAM of claim 1, wherein the at least one feedback symbol comprises an error signal generated by a demodulator.

10. A digital subscriber line access multiplexer (DSLAM) configured to couple to a first subscriber line and a second subscriber line, the DSLAM comprising:
    a processor configured to allocate a plurality of time slots for downstream far-end crosstalk (FEXT) channel estimation, wherein the plurality of time slots comprises a first period and a second period, wherein the first period precedes the second period, and wherein each of the first and second periods comprises at least one time slot;
    a transmitter coupled to the processor and configured to transmit at least one training symbol in the first period onto the second subscriber line while no transmission is made on the first subscriber line; and
    a receiver coupled to the processor and configured to receive at least one feedback symbol in the second period from the first subscriber line,
    wherein the processor is further configured to estimate a level of downstream FEXT from the second subscriber line into the first subscriber line based on the at least one feedback symbol, wherein the processor is further configured to allocate a second plurality of time slots for upstream FEXT channel estimation, wherein the receiver if further configured to receive an upstream signal from the first subscriber line in the second plurality of time slots, wherein at least one component of the upstream signal is induced by a plurality of training symbols in the second subscriber line, wherein the plurality of training symbols are transmitted by a customer premise equipment (CPE), and wherein the processor is further configured to estimate a level of upstream FEXT from the second subscriber line into the first subscriber line based on the upstream signal.

11. The DSLAM of claim 10, further configured to couple to a third subscriber line, wherein no transmission is made on the third subscriber line in the second plurality of time slots.

12. The DSLAM of claim 10, further configured to couple to a third subscriber line, wherein the receiver is further configured to receive a second upstream signal in the second plurality of time slots from the first subscriber line, wherein at least a component of the second upstream signal is induced by a second plurality of training symbols in the third subscriber line, wherein the second plurality of training symbols are transmitted by a second CPE, wherein the plurality of training symbols and the second plurality of training symbols are in different frequency ranges, and wherein the processor is further configured to estimate a level of upstream FEXT from the third subscriber line into the first subscriber line based on the second upstream signal.

13. A digital subscriber line access multiplexer (DSLAM) configured to couple to a first subscriber line and a second subscriber line, the DSLAM comprising:
    a processor configured to allocate a plurality of time slots for downstream far-end crosstalk (FEXT) channel estimation, wherein the plurality of time slots comprises a first period and a second period, wherein the first period precedes the second period, and wherein each of the first and second periods comprises at least one time slot;
    a transmitter coupled to the processor and configured to transmit at least one training symbol in the first period onto the second subscriber line while no transmission is made on the first subscriber line; and
    a receiver coupled to the processor and configured to receive at least one feedback symbol in the second period from the first subscriber line,
    wherein the processor is further configured to estimate a level of downstream FEXT from the second subscriber line into the first subscriber line based on the at least one feedback symbol wherein the at least one training symbol is received by a customer premise equipment (CPE) coupled to the second subscriber line and comprising an equalizer, and wherein the CPE is configured to train the equalizer in the plurality of time slots.

14. A digital subscriber line access multiplexer (DSLAM) configured to couple to a first subscriber line and a second subscriber line, the DSLAM comprising:
    a processor configured to allocate a plurality of time slots for downstream far-end crosstalk (FEXT) channel estimation, wherein the plurality of time slots comprises a first period and a second period, wherein the first period precedes the second period, and wherein each of the first and second periods comprises at least one time slot;

a transmitter coupled to the processor and configured to transmit at least one training symbol in the first period onto the second subscriber line while no transmission is made on the first subscriber line;

a receiver coupled to the processor and configured to receive at least one feedback symbol in the second period from the first subscriber line; and a FEXT precoder and a FEXT canceller, wherein the processor is further configured to train the FEXT precoder and/or the FEXT canceller in the plurality of time slots, wherein the processor is further configured to estimate a level of downstream FEXT from the second subscriber line into the first subscriber line based on the at least one feedback symbol.

15. The DSLAM of claim 1, wherein the plurality of time slots is allocated dynamically.

16. The DSLAM of claim 1, wherein allocating the plurality of time slots is pre-determined as a fixed part of a superframe.

17. A method of far-end crosstalk (FEXT) channel estimation in a Digital subscriber line (DSL) system, wherein the DSL system comprises a first subscriber line and a second subscriber line, and wherein the first and second subscriber lines are subject to FEXT, the method comprising:

allocating a plurality of time slots, wherein the plurality of time slots comprises a first period and a second period, wherein the first period precedes the second period, and wherein each of the first and second periods comprises at least one time slot;

transmitting at least one training symbol in the first period onto the second subscriber line in a downstream direction while no transmission is made on the first subscriber line;

receiving at least one feedback symbol in the second period from the first subscriber line in an upstream direction; and estimating a level of downstream FEXT from the second subscriber line into the first subscriber line based on the at least one feedback symbol, wherein the first subscriber line is a showtime line, wherein the second subscriber line is a joining line, and wherein no transmission is made on the second subscriber line in the second period.

18. The method of claim 17, wherein the DSL system further comprises a third subscriber line, wherein the second and third subscriber lines are subject to FEXT, wherein the plurality of time slots further comprises a third period trailing the second period, wherein the third period comprises at least one time slot, wherein no transmission is made on the third subscriber line in the first and second periods, and wherein the method further comprises:

receiving at least one other feedback symbol in the third period from the third subscriber line in the upstream direction; and estimating a level of downstream FEXT from the second subscriber line into the third subscriber line based on the at least one other feedback symbol.

19. The method of claim 17, wherein the DSL system further comprises a third subscriber line, wherein the second and third subscriber lines are subject to FEXT, wherein the third subscriber line is another joining line, and wherein no transmission is made on the third subscriber line in the first and second periods.

20. The method of claim 18, further comprising:
allocating a second plurality of time slots; and
estimating a level of downstream FEXT from the third subscriber line into the first subscriber line in the second plurality of time slots, wherein the plurality of time slots and the second plurality of time slots correspond to different superframes.

21. The method of far-end crosstalk (FEXT) channel estimation in a Digital subscriber line (DSL) system, wherein the DSL system comprises a first subscriber line and a second subscriber line, and wherein the first and second subscriber lines are subject to FEXT, the method comprising:

allocating a plurality of time slots, wherein the plurality of time slots comprises a first period and a second period, wherein the first period precedes the second period, and wherein each of the first and second periods comprises at least one time slot;

transmitting at least one training symbol in the first period onto the second subscriber line in a downstream direction while no transmission is made on the first subscriber line;

receiving at least one feedback symbol in the second period from the first subscriber line in an upstream direction;

estimating a level of upstream FEXT from the second subscriber line into the first subscriber line based on the at least one feedback symbol;

allocating a second plurality of time slots;

receiving an upstream signal from the first subscriber line in the second plurality of time slots, wherein at least a component of the upstream signal is induced by a plurality of training symbols in the second subscriber line, wherein the plurality of training symbols are transmitted by a customer premise equipment (CPE); and estimating a level of upstream FEXT from the second subscriber line into the first subscriber line based on the upstream signal.

22. The method of claim 21, wherein the DSL system further comprises a third subscriber line, wherein the second and third subscriber lines are subject to FEXT, wherein the third subscriber line is another joining line, and wherein no transmission is made on the third subscriber line in the second plurality of time slots.

23. An apparatus used in digital subscriber line (DSL) communication comprising:

a receiver configured to receive a downstream signal in a first period from a first subscriber line, wherein the downstream signal comprises a component induced by far-end crosstalk (FEXT) from a second subscriber line introduced into the first subscriber line;

a processor configured to generate an error signal based on the downstream signal, wherein the error signal is a measure of FEXT from the second subscriber line introduced into the first subscriber line; and a transmitter configured to transmit at least one feedback symbol comprising the error signal in a second period onto the first subscriber line, wherein the first period precedes the second period, and wherein each of the first and second periods comprises at least one time slot, wherein the first subscriber line is a showtime line, and wherein the second subscriber line is a joining line, and wherein no transmission is made on the first subscriber line in the first period.

24. The apparatus of claim 23, wherein the transmitter is further configured to transmit at least one training symbol onto the first subscriber line, and wherein the at least one training symbol are used for upstream FEXT channel estimation.

* * * * *